INVENTOR
ALFRED YURDIN
BY
ATTORNEY

United States Patent Office 3,402,741
Patented Sept. 24, 1968

3,402,741
SELF-SUPPORTING, BENDABLE, SHAPE
RETAINING DISCHARGE CONDUIT
Alfred Yurdin, 10 Fenton Drive,
Short Hills, N.J. 07078
Filed June 21, 1965, Ser. No. 465,459
5 Claims. (Cl. 138—118)

ABSTRACT OF THE DISCLOSURE

A self-supporting, bendable, shape retaining discharge conduit, which is bendable upon itself to any extreme degree without closing the discharge passage but which is sufficiently rigid to be both self-supporting and to retain its bent shape until a different shape is created by the application of an external force.

---

Many various types of discharge conduits are known which fall into two broad classes: Rigid conduits having a fixed shape and flexible conduits whose shape may be altered. The flexible conduits are generally not shape retaining but rather will bend easily even under the influence of gravity. Some of the more rigid conduits which are self-supporting can not be easily bent or, if bendable, fold to close off the internal passage.

In the hardware arts, it is frequently necessary to provide a conduit for the application of oil or some other liquid to a wide variety of remote areas. More frequently than not, the rigid, unyielding conduit can not be oriented to reach the point of discharge. The soft flexible conduits on the other hand are not self-supporting and, therefore, can not be guided around obstacles. Even conduits which are bendable and self-supporting are not capable of tortuous bending without completely or substantially completely shutting off the discharge passage.

Therefore, it is among the objects and advantages of my invention to provide a discharge conduit which is easily bendable into any tortuous shape to any degree and is sufficiently rigid to be both self-supporting and to retain its bent tortuous shape until the application of external bending forces.

Another object of my invention is to provide a discharge conduit which may be bent into any tortuous shape to any degree without closing the internal passage.

Yet another object of my invention is to provide a discharge conduit having a bendable, internal former extending throughout the internal passage in a flexible, external tube.

Still another object of my invention is to provide a discharge conduit having a bendable internal former which guides droplets of fluid through the internal passage of an external tube thereby preventing complete closure of the internal passage no matter what degre the wire and tube are bent.

Still a further object of my invention is to provide a discharge conduit of the character described having an internal coil spring at at least one end of the internal passage to control the volume and rate of liquid discharge and to help prevent collapse of the external tube.

Yet a further object of my invention is to provide a discharge conduit having an internal former which both permits and stimulates the back flow of air through the internal passage to relieve air pressure.

Still a further object of my invention is to provide a discharge conduit having an internal former wherein liquid will pass through the conduit irrespective of the tortuosity of bends under the influence of gravity.

A further object of my invention is to provide a discharge conduit having an internal former with a coil spring at the discharge end thereof to control the size of discrete droplets of liquid being discharged from the end thereof.

Yet still a further object of my invention is to provide a discharge conduit of the character described above which is readily attachable and detachable from a wide variety of nozzles provided on fluid containers such as oil cans.

Another object of my invention is to provide a discharge conduit having an internal, bendable, self-supporting, shape retaining former which has a relatively small cross-sectional area as compared to the cross-sectional area of the internal passage of the conduit.

Yet another object of my invention is to provide a discharge conduit having an internal former of the character described which may be fabricated of any convenient material such as steel, aluminum alloys and the like which are malleable, easily bendable yet sufficiently rigid to be self-supporting and to retain their bent shape.

These objects and advantages as well as other objects and advantages may be achieved by my invention two embodiments of which are illustrated in the drawings, in which.

Figure 1:
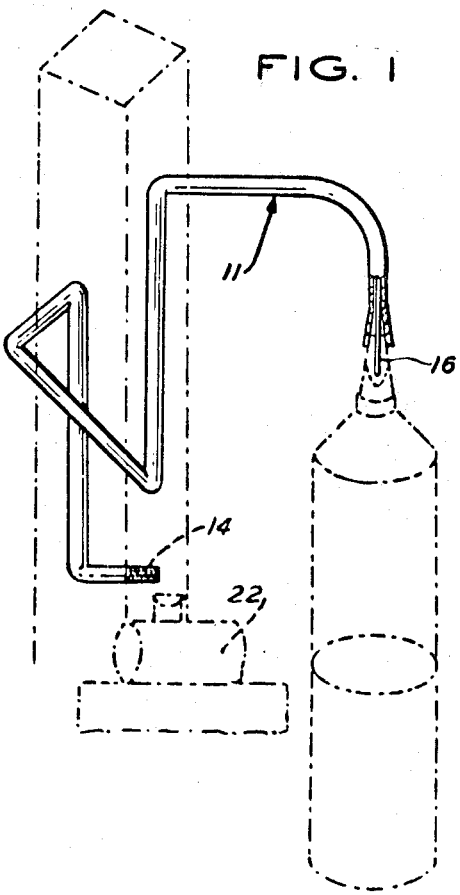
FIGURE 1 is a view in perspective of one embodiment of my discharge conduit tortuously bent about a column shown in broken lines, the conduit being attached to a well-known oil can dispenser.

Referring now to the drawings in detail, my conduit comprises a supple and flexible external tube 11 having a longitudinal internal passage 12. The tube 11 may be fabricated of any convenient material such as polyethylene or the like and is generally not self-supporting. Positioned within the tube is a former 13 which is easily bendable but which is sufficiently rigid to be self-supporting and sufficiently non-resilient to retain its shape after bending. Such a former may take the form of a malleable metal wire such as soft steel, aluminum or the like which has a cross-sectional area substantially less than the cross-sectional area of the internal passage 12 in the tube 11.

The tube 11 may be provided in one embodiment of my invention, with a tightly wound coil spring 14 in at least one of the ends of the internal passage 12. The spring 14 is frictionally engaged within the said passage.

In the alternative, the wire former 13 may be provided with a terminal loop 15 at the discharge end of the conduit 11.

The spring 14 prevents collapse of the soft flexible tube 11 at the discharge end and, as well, controls both the rate of discharge of the fluid passing through the tube and the size of the droplet emitted. At the opposite end of the tube 11, the spring will prevent collapse of the tube at the point where it engages the fluid container such as a nozzle 16.

Obviously, the loop 15 could be substituted for one of the springs 14 with the opposite end of the tube 11 provided with a spring.

It is also advantageous to provide a former 13 which is longer than the tube 11 so that a portion or extension thereof 17 extends beyond the input end. The extension 17 inserts into the nozzle 16 of the fluid container.

Figure 3:
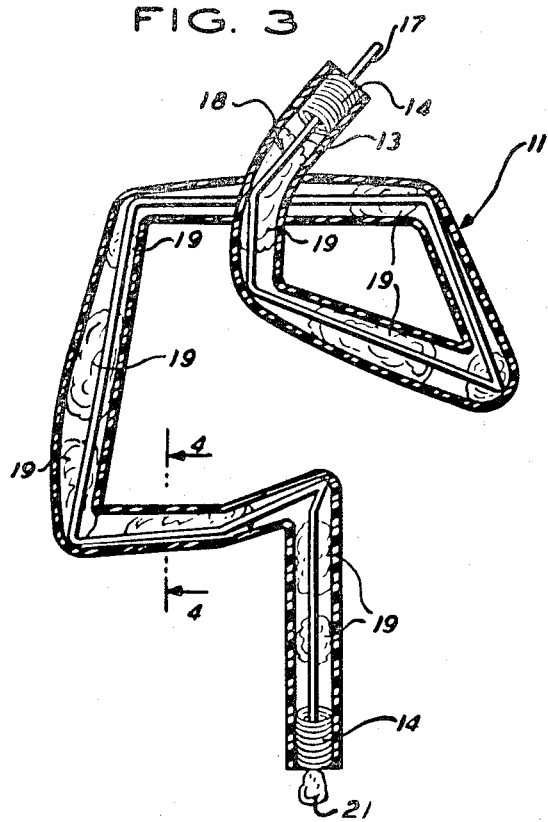
FIGURE 3 is a partially broken-away view in perspective of the discharge conduit illustrated in FIGURE 1 showing discrete droplets of liquid negotiating tortuous bends.
Figure 2:
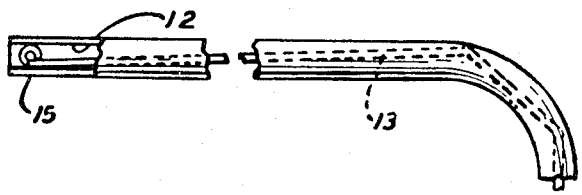
FIGURE 2 is a side elevational, partially broken-away view of another form of my discharge conduit.

In operation, the conduit 11 is applied to any convenient liquid container, the spring 14 and the extension 17 helping to firmly attach the tube 11 to the container. The tube, with the former 13 extending therein, can be bent in any tortuous configuration desired or necessary to meet the particular requirements. In FIGURE 1, the conduit 11 is shown bending around a column shown in broken lines. In FIGURE 3, a somewhat more tortuous configuration is illustrated.

Figure 4:
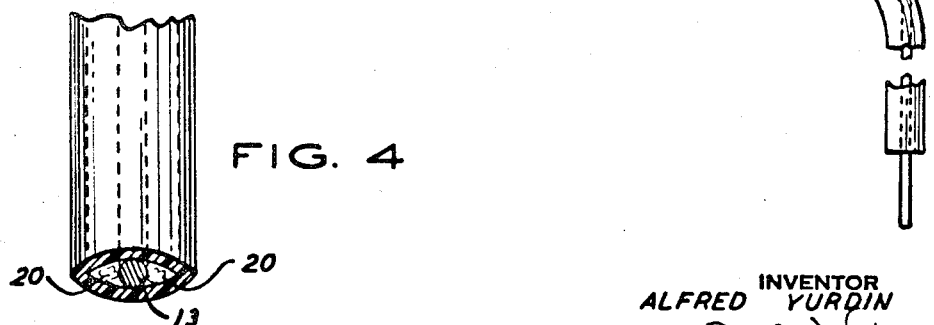
FIGURE 4 is a partially cross-sectional view taken along line 4—4 in FIGURE 3 looking in the direction of the arrows.

In FIGURE 3, the manner in which the wire conducts the liquid 18 through the tube 11 is illustrated. As can be seen from the cross-sectional view, the fluid 18 clings to the wire former 13 in discrete droplets 19, 19 etc. The former 13 prevents complete collapse of the tube 11 at the point of extreme bend. As is illustrated in FIGURE 4, the flexible tube 11 tends to flatten out at the point of extreme bend but the wire former 13 prevents the walls of the tube 11 from contacting each other completely thereby effectively shutting down the internal passage 12. There is thus provided at very least generally sectorial passages 20, 20 on opposite sides of the wire former 13 and the fluid, clinging to the wire, easily negotiates the turn. Similarly, as is illustrated in FIGURE 3, the wire permits air pockets to pass both forwardly and rearwardly through the internal passage 12 thereby relieving air pressure.

The spring 14 at the discharge end of the tube 11 controls the rate of passage of the droplets 19 therethrough and divides them into controlled discrete drops 21 of substantially equal volume. In addition, the spring tends to resist surging of the fluid through the tube which would result in excessively rapid discharge.

It should be borne in mind that the container may be of a rigid, non-squeezable character or of a squeezable character. My conduit 11 is so constructed that droplets 19 will pass therethrough under merely the influence of gravity for a substantial period of time before the vacuum in the container is sufficient to stem the flow. Relief of the vacuum frequently occurs by back passage of air through the tube 11 so that air binding never occurs. However, should air binding occur, as for instance with an extremely viscous fluid, the tube 11 is positioned in an upright position and the fluid tends to flow rearwardly therethrough into the can until an air passage opens relieving the vacuum within the container.

The problem of air binding is somewhat less in the case of the squeezable dispenser wherein the resilient walls of the container tend to draw the fluid rearwardly through the tube opening an air passage rather quickly.

The wire former, of course, is fabricated of some malleable material and, therefore, does not tend to break no matter how frequently it is bent and rebent. However, once bent, the wire former 13 retains its bent shape until rebent. Of course, the wire former 13 is sufficiently rigid to support the tube 11 in the bent position. Moreover, a substantial degree of overbend of the former 13 is required to invest it with a permanent shape change. Thus, the entire conduit, is somewhat resilient, returning to the bent shape even if struck or pushed against an object. This is extremely important when trying to wind the tube 11 past various obstacles to arrive at the point of discharge as is illustrated in FIGURE 1 where the discharge is an oil cup in a motor 22.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:
1. A discharge conduit comprising,
 (a) a foldable tube having an internal, longitudinal passage,
 (b) a bendable former freely mounted in the passage, the former being axially movable in the passage in both directions in response to flexing of the tube,
 (c) one end of the former being projectable beyond the output end of the tube, the opposite end of the former normally projecting beyond the input end of the tube.
2. A discharge conduit comprising,
 (a) the structure in accordance with claim 1, in which,
 (b) the cross-sectional area of the former is substantially less than the cross-sectional area of the passage.
3. A discharge conduit comprising,
 (a) the structure in accordance with claim 1, in which,
 (b) the cross-sectional area of the former is just sufficiently less than the cross-sectional area of the passage to permit rearward flow of the fluid therein through the input end thereof in response to gravity against flow resistant action between the fluid, the former and the passage, when the tube is in a generally upright position.
4. A discharge conduit comprising,
 (a) the structure in accordance with claim 1, in which,
 (b) the tube is foldable over upon itself at extremely acute angles and,
 (c) a generally annular coil spring is seated in the passage at the discharge end thereof.
5. A discharge conduit comprising,
 (a) the structure in accordance with claim 1, in which,
 (b) the former is sufficiently resilient to withstand substantial flexion without permanent deformation but sufficiently malleable to retain deformation upon an overbend exceeding its resiliency.

References Cited

UNITED STATES PATENTS

| | | | |
|---|---|---|---|
| 865,355 | 9/1907 | Callman et al. | 239—588 |
| 1,314,156 | 8/1919 | Sjogren | 222—577 X |
| 2,915,089 | 12/1959 | Horsting | 138—113 |
| 2,968,441 | 1/1961 | Holcomb | 222—527 X |
| 2,998,028 | 8/1961 | Rohde | 138—118 X |

FOREIGN PATENTS

| | | |
|---|---|---|
| 704,816 | 5/1931 | France. |
| 976,640 | 12/1964 | Great Britain. |

LAVERNE D. GEIGER, *Primary Examiner.*

C. L. HOUCK, *Assistant Examiner.*